(12) United States Patent
Kawamura et al.

(10) Patent No.: US 7,560,069 B2
(45) Date of Patent: Jul. 14, 2009

(54) MATERIAL INCLUDING BERYLLIUM INTERMETALLIC COMPOUND AND HAVING EXCELLENT HIGH-TEMPERATURE PROPERTY APPLIED TO NUCLEAR FUSION REACTOR

(75) Inventors: Hiroshi Kawamura, Higashiibaraki-Gun (JP); Munenori Uchida, Nagoya (JP); Minoru Uda, Nagoya (JP); Yoshio Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 447 days.

(21) Appl. No.: 10/954,958

(22) Filed: Sep. 30, 2004

(65) Prior Publication Data

US 2005/0135960 A1     Jun. 23, 2005

Related U.S. Application Data

(63) Continuation of application No. PCT/JP03/04462, filed on Apr. 8, 2003.

(30) Foreign Application Priority Data

| Apr. 8, 2002 | (JP) | 2002-105742 |
| Aug. 30, 2002 | (JP) | 2002-253284 |
| Aug. 30, 2002 | (JP) | 2002-253285 |

(51) Int. Cl.
*G21B 1/00* (2006.01)
(52) U.S. Cl. ................................................. 420/401
(58) Field of Classification Search ................ 420/401
See application file for complete search history.

(56) References Cited

U.S. PATENT DOCUMENTS

| 2,991,238 A | 7/1961 | Phillips |
| 3,989,517 A | 11/1976 | Tanner et al. |

FOREIGN PATENT DOCUMENTS

| JP | 51-79613 A1 | 7/1976 |
| JP | 60-255948 A1 | 12/1985 |
| JP | 09-087782 A1 | 3/1997 |
| JP | 09-133787 A1 | 5/1997 |

OTHER PUBLICATIONS

Fleischer, R.L. and Zabala, R.J., Mechanical Properties of High-Temperature Beryllium Intermetallic Compounds, Metallurgical Transactions A, vol. 20A, Jul. 1989, pp. 1279-1282.*

Enoeda, Mikio, Application of Li2TiO3 and Be12Ti in Supercritical water cooled solid blanket for DEMO, US-Japan Workshop on Fusion Power Plants and Related Advanced Technologies With EU Participation, Apr. 6-7, 2002, Hotel Hyatt Islandia, San Diego, CA.*

(Continued)

*Primary Examiner*—Sikyin Ip
(74) *Attorney, Agent, or Firm*—Burr & Brown (57) ABSTRACT

A material for a nuclear fusion reactor of the present invention contains intermetallic compounds of beryllium with Ti, V, Zr, Nb, Ta, Mo, W or Y. The beryllium intermetallic compounds are mixed with another metal or intermetallic compound. The material is preferably applied to blankets and facing members which are exposed to neutrons and heat generated by plasma of the nuclear fusion reactor.

5 Claims, 1 Drawing Sheet

OTHER PUBLICATIONS

Koichi Yamada et al., "Chuseishi Zobaizai to shite Beryllium Kinzoku-kan Kagobutsu o Mochiita Kaku Yugoro Blanket no Kakuteki Yobi Kento," Atomic Energy Society of Japan Haru no Nenkai Yoshishu, Dai 40 Kai separate vol. 1, Mar. 5, 2002, p. 40.

Hirotomo Iwakiri et al., "$Be_{12}Ti$ ni okeru Jusuiso Hoji • Hoshutsu Tokusei," Atomic Energy Society of Japan Haru no Nenkai Yoshishu, Dai 40 Kai separate vol. 1, Mar. 5, 2002, p. 41.

Muneori Uchida et al., "$Be_{12}Ti$ to Stainless-ko no Ryoritsusei Shiken," Atomic Energy Society of Japan Haru no Nenkai Yoshishu, Dai 40 Kai separate vol. 1, Mar. 5, 2002, p. 42.

S.A. Fabritsiev et al., "The Neutron Irradiation Effect on the Mechanical Properties and Structure of Beryllium," Spec. Technical Publication, (American Society Test Mater), 1999, No. 1325, pp. 1062-1076.

"Establishment of a world first mass-production technology for neutron multiplier pebbles" [Online] Feb. 23, 2001, XP002455883.

Park J—H et al: "CaO insulator and Be intermetallic coatings on V-base alloys for liquid-lithium fusion blanket applications" 16th IEEE/NPSS Symposium Fusion Engineering, SOFE '95. Seeking a New Energy Era (Cat No. 95CH35852) IEEE New York, USA, vol. 2, 1995, pp. 960-963 vol. 2, XP002455876.

Bruemmer et al. "Properties and potential of high-temperature niobium beryllides" 1992 Fall Meeting of Materials Research Society, Dec. 1992, XP002455938.

Kawamura H et al. "Application of beryllium intermetallic conpounds to neutron multiplier of fusion blanket" Fusion Engineering and Design Elsevier Switzerland, vol. 61-62, Nov. 2002, pp. 391-397, XP002455965.

Kawamura et al. "Compatibility between Be12Ti and SS316LN" Journal of Nuclear Materials, vol. 307-311, Dec. 2002, pp. 638-642, XP002455996.

* cited by examiner

MATERIAL INCLUDING BERYLLIUM INTERMETALLIC COMPOUND AND HAVING EXCELLENT HIGH-TEMPERATURE PROPERTY APPLIED TO NUCLEAR FUSION REACTOR

CROSS REFERENCE TO RELATED APPLICATIONS

This application is a continuation of International Application No. PCT/JP2003/004462, having an international filing date of Apr. 8, 2003, which designated the United States, the entirety of which is incorporated herein by reference.

This application also claims the benefit of Japanese Application No. 2002-105742, filed Apr. 8, 2002, Japanese Application No. 2002-253284, filed Aug. 30, 2002, and Japanese Application No. 2002-253285, filed Aug. 30, 2002, the entireties of which are incorporated herein by reference.

TECHNICAL FIELD

The present invention relates to a material including a beryllium intermetallic compound applied to nuclear fusion reactors and more specifically relates to a material including a beryllium intermetallic compound applied to blankets and plasma facing members of nuclear fusion reactors, which are exposed to neutrons and heat generated by plasma in the nuclear fusion reactors.

BACKGROUND ART

A Tokamak nuclear fusion reactor generates ring-like plasma so as to produce nuclear fusion reaction therein by means of electromagnetic coils arranged like a circumference. The ring-like plasma radiates neutrons and radiant heat and hence blankets and plasma facing members are disposed so as to enclose the plasma. The blanket is essentially composed of neutron multiplier members for further breeding neutrons from the radiated neutrons, tritium multiplier members for breeding tritiums from the multiplied neutrons and cooling water circulation system for cooling these members so as to extract heat. The plasma facing members are disposed within the blankets so as to protect the blankets from the plasma.

To the blankets and the plasma facing members, it is necessary to apply materials of reduced susceptibility of swelling, which is defined as volumetric expansion results from bubbles generated in the materials caused by exposure to radiation. Furthermore, the materials are required not to absorb a large amount of tritiums so as to effectively collect the tritiums.

Among materials for the blankets, the material applied to the neutron multiplier members is required to have a large reaction cross section with respect to the neutrons. Beryllium formed in small pebbles has been conventionally employed.

As the material applied to the plasma facing member, it is necessary to be less susceptible of sputtering erosion by the plasma and has small radiation loss in a case where contamination into the plasma caused by the sputtering occurs. Tungsten, beryllium and carbon or carbon composite material has been hitherto under examination for application.

DISCLOSURE OF INVENTION

Beryllium has relatively excellent properties with respect to any of the aforementioned applications. Beryllium would not cause any trouble in a case where the temperature is below about 400 degree C. and the exposure to the neutrons is below about 3000 appmHe, but might give rise to risks of hydrogen generation and consequent hydrogen explosion led from an oxidation reaction by a high-temperature water vapor in a case where the temperature in use is beyond about 600 degree C. and any accident such as breaking of cooling tubes is happened. Moreover, beryllium has a problem of reactivity with a stainless steel ISO-19N of which the blanket is made. Furthermore, there is a possibility that large swelling of beryllium leads to breaking of a vessel and such accidents. On the other hand, as the plasma facing material, beryllium is more susceptible of sputtering erosion than tungsten, carbon and carbon composite materials. Therefore any material capable of use in higher temperature and less susceptible of sputtering erosion is expected.

The present invention is accomplished in view of the above problem and intended for providing a material for nuclear fusion reactors being capable of use in higher temperature and less susceptible of sputtering erosion.

The present inventors paid their attention to intermetallic compounds of beryllium with Ti, V, Zr, Nb, Ta, Mo, W or Y as also having the excellent properties of beryllium and additionally having a high-temperature property and being less susceptible of sputtering erosion. Such beryllium intermetallic compounds are generally brittle and hence uneasy to be machined and handled. The present inventors invented that brittleness of the beryllium intermetallic compounds can be overcome by means of dispersing the compounds in another metal or making composites with another intermetallic compounds and then reached to the present invention of the material practically applied to the nuclear fusion reactors.

According to a first aspect of the present invention, a material for a nuclear fusion reactor is an alloy including at least one beryllium intermetallic compound phase. The beryllium intermetallic compound phase preferably consists of a compound of Be with one or more elements selected from the group of Ti, V, Zr, Nb, Ta, Mo, W and Y. More preferably, a matrix phase thereof consists of one or more metals selected from the group of Be, Zr, Ti and V. Still preferably, a volumetric ratio of the beryllium intermetallic compound phase is 50 to 99%. The material for the nuclear fusion reactor is preferably applied to a neutron multiplier material.

According to a second aspect of the present invention, a material for a nuclear fusion reactor consists one essentially of one or more substances selected from the group of $Be_{12}M$ or $Be_{13}M$ and $Be_{17}M_2$; or two or more substances selected from the group of $Be_{12}M$ or $Be_{13}M$, $Be_{17}M_2$, Be and M, wherein M is a metal element selected from the group of Ti, V, Mo, W, Zr, Nb and Ta, and an average content x of M is in a range of $2.0 \leq x \leq 15.0$ (at %), or preferably $7.7 < x < 10.5$ (at %). The material for the nuclear fusion reactor consisting of beryllium intermetallic compounds is preferably applied to a nuclear multiplier material, and further applied to a plasma facing material as well.

Preferably, the material for the nuclear fusion reactor of any of the above aspects is produced by casting or sintering and a crystal particle size is no more than 50 μm.

BEST MODE FOR CARRYING OUT THE INVENTION

First Embodiment

A neutron multiplier material according to the present invention includes metallic phases interposed between the beryllium intermetallic compound phases so that the metallic phases adhere the beryllium intermetallic compound phases and accordingly whole body of the neutron multiplier material gets higher ductility, which leads to advantages of machinability and easiness of handling.

To the beryllium intermetallic compound phases of the present invention, compounds of beryllium with Ti, V, Zr, Nb, Ta, Mo, W or Y, listed below as examples, are specifically preferably adapted.

$Be_{12}Ti$ (1550 degree C.), $Be_{17}Ti_2$ (1650 degree C.), $Be_{12}V$ (1700 degree C.), $Be_{13}Zr$ (1800 degree C.), $Be_{17}Zr_{12}$ (1600 degree C.), $Be_{12}Nb$ (1700 degree C.), $Be_{17}Nb_2$ (1800 degree C.), $Be_{12}Ta$ (1850 degree C.), $Be_{17}Ta_2$ (1970 degree C.), $Be_{12}Mo$ (1700 degree C.), $Be_{12}W$ (1750 degree C.), $Be_{22}W$ (1600 degree C.), $Be_{13}Y$ (1920 degree C.), where the values put in parentheses respectively indicate melting points thereof.

Any of the aforementioned beryllium intermetallic compounds has a high melting point and high oxidation resistance so as to indicate excellent heat-resistance.

While such beryllium intermetallic compounds are slightly inferior in the neutron multiplying effect to metallic beryllium, tritium inventory and reactivity with structural members of the blanket are relatively lower. Particularly, anti-swelling property thereof is exceedingly good.

Moreover, to the metallic phase of the present invention, any metal selected from the group of Be, Zr, Ti and V is preferable. Because these metals effectively go around and fill gaps among the beryllium intermetallic compounds and hence efficiently increase ductility of the multiplier material including the beryllium intermetallic compounds as a whole.

Particularly, Be and Zr are further preferably applied to the metallic phase as having a neutron multiplying function as well.

Furthermore, a ratio of the beryllium intermetallic phase in such a neutron multiplying material is favorably set about 50 through 99% in volumetric ratio.

Because, provided that the mixing ratio does not reach 50 vol %, reactivity with vapor and such and swelling are remarkably increased and, provided that the mixing ratio exceeds 99 vol %, the effect of increasing ductility by the metallic phase is decreased so that reduction of the machinability and the easiness of handling is unavoidable.

Size of pebbles of the neutron multiplier material according to the present invention is preferably set about 0.1 through 3.0 mm in average particle diameter. Out-of-sphericity thereof is preferably set no more than 0.5 times the particle diameter.

Size of the beryllium intermetallic compound phases included in the neutron multiplier material is preferably set no more than about 100 μm in circle-equivalent diameter.

Furthermore, concentration of Fe included in the neutron multiplier material is preferably set no more than about 0.4 mass % and concentration of mixed oxides is preferably set no more than about 5.0 mass %.

Production methods of the neutron multiplier material according to the present invention will be described hereinafter.

The present invention does not require particular limits to the production method, however, a rotating electrode method and a powder metallurgy method, both of which are previously publicly known, are preferably applied.

Rotating Electrode Method

To employ the rotating electrode method to produce neutron multiplier material pebbles, first of all, preparing consumable electrode is necessary. To prepare the consumable electrode, providing metals, weights of which correspond to a ratio satisfying a weight ratio of the respective constituents of the desired intermetallic compound, melting the metals together, casting the mixture and machining the cast into a predetermined electrode shape are accomplished.

Next, preparing the neutron multiplier material pebbles from the obtained consumable electrode by means of the rotating electrode method is accomplished.

Production conditions on this occasion are not particularly restricted, however, preferable conditions are described as follows.

atmospheric gas pressure: 500 to 12000 Torr
arc current: 100 to 1000 A
rotation speed of the consumable electrode: 4 to 1000 m/s Powder Metallurgy Method To produce neutron multiplier material pebbles by means of this method, mixing intermetallic compound powder prepared to be a desired compositional ratio and metal powder having a weight so as to be a predetermined ratio of metal phase included in the neutron multiplier material, filling the mixed powder in spherical metal molds or such, forming green compacts in spherical shapes by means of cold pressing or such and sintered to be pebbles in a vacuum atmosphere are accomplished.

Figure 1:
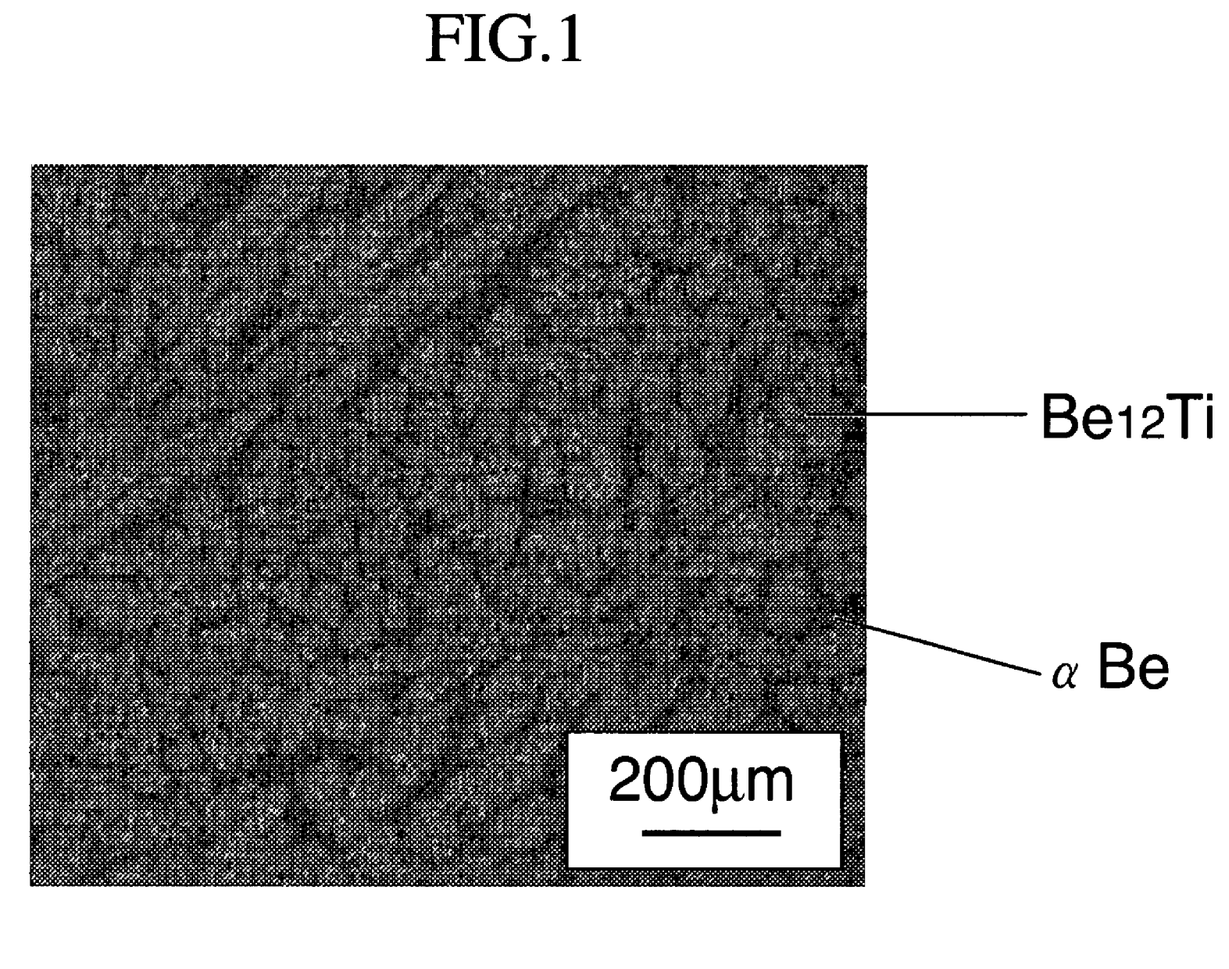
FIG. 1 shows a micro-metallograph of a neutron multiplier material according to a first embodiment of the present invention.

FIG. 1 shows a micro-metallograph of a neutron multiplier material obtained from the aforementioned rotating electrode method. The neutron multiplier material is an example which includes $Be_{12}Ti$ (95% in volumetric ratio) as a beryllium intermetallic compound phase and Be as a metallic phase.

As shown in the drawing, it is clearly understood that an α-Be phase uniformly surrounds grains of $Be_{12}Ti$ according to the present invention.

EXAMPLE 1

Neutron multiplier materials respectively including beryllium intermetallic compounds and metals, compositions of which are described in Table 1, are produced by means of the rotating electrode method or the powder metallurgy method. Particle sizes of the obtained neutron multiplier materials are 0.7 to 1.3 mm.

Results of evaluation about a neutron multiplying effect, an anti-swelling property, a ductility, a reactivity with the structural member, a reactivity with the vapor, a tritium inventory and a heat conductivity of each of thus obtained neutron multiplier materials are described in Table 2.

In addition, the respective properties are evaluated by the following procedures.

Neutron Multiplying Effect

A neutron multiplying effect is evaluated as a relative ratio to the neutron multiplying effect of the conventional metallic beryllium pebbles as 10, considering the neutron reaction cross section, the neutron absorption cross section and the neutron capture cross section of each of the constituent elements.

Anti-swelling Property

An amount of swelling is measured in a condition that neutrons are irradiated to the test piece so as to generate 4000 ppm of He therein at 700 degree C. and the anti-swelling property is evaluated on a degree of swelling as three levels of SMALL (the swelling amount is not more than 0.5 vol %), MIDDLE (more than 0.5 vol % and not more than 3.0 vol %) and LARGE (more than 3.0 vol %), where the swelling amount is measured by volumetric change rate (ΔV/V times 100 (%)).

Ductility

A compression test is accomplished with a test piece of approximate 1 mmΦ pebble in diameter in a condition of compression speed: 0.2 mm/min and ductility is evaluated on shapes after the test.

Reactivity with the Structural Members

A reactivity test with stainless steel in a He atmosphere of 6N for 800 to 1000 h is accomplished and the reactivity is evaluated on a degree of reaction with the structural members as three levels of SMALL (reaction layer: no more than 50 μm), MIDDLE (reaction layer: more than 50 μm and no more than 200 μm) and LARGE (reaction layer: more than 200 μm).

Reactivity with the Vapor

A reactivity test with the water vapor at 800 degree C. is accomplished and the reactivity is evaluated on a degree of reaction with the water vapor as three levels of SMALL (rarely oxidized), MIDDLE (oxidized) and LARGE (destructed by oxidation).

Tritium Inventory

Tritium inventory is evaluated on an amount of tritium of the test piece accomplished of the swelling test, measured by the temperature-programmed desorption method. Specifically, the tritium inventory is evaluated on a degree of the tritium inventory as three levels of SMALL (extremely small amount), MIDDLE (some amount) and LARGE (large amount).

TABLE 1

| No | Intermetallic compound | (vol %) | Metallic phase | (vol %) | Production method | Melting point (° C.) |
|---|---|---|---|---|---|---|
| 1 | $Be_{12}Ti$ | 100 | — | — | rotating electrode | 1550 |
| 2 | ↑ | 95 | Be | 5 | ↑ | 1530 |
| 3 | ↑ | 93 | Be | 7 | ↑ | 1500 |
| 4 | ↑ | 90 | Be | 10 | powder metallurgy | 1450 |
| 5 | ↑ | 85 | Be | 15 | ↑ | 1400 |
| 6 | ↑ | 55 | Be | 45 | ↑ | 1350 |
| 7 | $Be_{17}Ti_2$ | 90 | Be | 10 | ↑ | 1550 |
| 8 | $Be_{12}V$ | 100 | — | — | ↑ | 1700 |
| 9 | ↑ | 95 | Be | 5 | rotating electrode | 1670 |
| 10 | ↑ | 93 | Be | 7 | ↑ | 1650 |
| 11 | ↑ | 90 | Be | 10 | powder metallurgy | 1600 |
| 12 | ↑ | 85 | Be | 15 | ↑ | 1550 |
| 13 | $Be_{13}Zr$ | 93 | Be | 7 | rotating electrode | 1720 |
| 14 | ↑ | 90 | Be | 10 | powder metallurgy | 1700 |
| 15 | $Be_{17}Zr_2$ | 90 | Be | 10 | ↑ | 1500 |
| 16 | $Be_{12}Nb$ | 90 | Be | 10 | ↑ | 1600 |
| 17 | $Be_{17}Nb_2$ | 90 | Be | 10 | ↑ | 1700 |
| 18 | $Be_{12}Ta$ | 93 | Be | 7 | rotating electrode | 1770 |
| 19 | ↑ | 90 | Be | 10 | powder metallurgy | 1750 |
| 20 | $Be_{17}Ta_2$ | 90 | Be | 10 | ↑ | 1900 |
| 21 | $Be_{12}Mo$ | 95 | Be | 5 | rotating electrode | 1650 |
| 22 | ↑ | 90 | Be | 10 | powder metallurgy | 1600 |
| 23 | $Be_{12}W$ | 95 | Be | 5 | rotating electrode | 1700 |
| 24 | ↑ | 90 | Be | 10 | powder metallurgy | 1650 |
| 25 | $Be_{22}W$ | 90 | Be | 10 | ↑ | 1500 |
| 26 | $Be_{13}Y$ | 90 | Be | 10 | ↑ | 1800 |
| 27 | $Be_{12}Ti$ | 90 | Zr | 10 | ↑ | 1550 |
| 28 | ↑ | 90 | Ti | 10 | ↑ | 1550 |
| 29 | ↑ | 60 | Ti | 40 | ↑ | 1550 |
| 30 | ↑ | 90 | V | 10 | ↑ | 1550 |
| 31 | $Be_{12}V$ | 90 | Zr | 10 | ↑ | 1550 |
| 32 | ↑ | 70 | Zr | 30 | ↑ | 1550 |
| 33 | ↑ | 90 | Ti | 10 | ↑ | 1550 |
| 34 | ↑ | 90 | V | 10 | ↑ | 1550 |
| 35 | $Be_{12}Mo$ | 90 | Zr | 10 | ↑ | 1550 |
| 36 | ↑ | 90 | Ti | 10 | ↑ | 1550 |
| 37 | ↑ | 90 | V | 10 | ↑ | 1550 |
| 38 | — | — | Be | 100 | rotating electrode | 1280 |

TABLE 2

| No. | Neutron multiplying effect | Anti-swelling property | Ductility* | Reactivity with the structural members | Reactivity with the vapor | Tritium inventory | Thermal conductivity (W/m K) | remarks |
|---|---|---|---|---|---|---|---|---|
| 1 | 0.90 | SMALL | X | SMALL | SMALL | SMALL | 40 | comparative example |
| 2 | 0.92 | SMALL | ○ | SMALL | SMALL | SMALL | 55 | present invention |
| 3 | 0.92 | SMALL | ○ | SMALL | SMALL | SMALL | 55 | ↑ |
| 4 | 0.93 | MIDDLE | Δ | MIDDLE | MIDDLE | MIDDLE | 65 | ↑ |
| 5 | 0.94 | MIDDLE | Δ | MIDDLE | MIDDLE | MIDDLE | 70 | ↑ |
| 6 | 0.95 | MIDDLE | ○ | LARGE | LARGE | LARGE | 90 | ↑ |
| 7 | 0.85 | MIDDLE | Δ | MIDDLE | MIDDLE | MIDDLE | 70 | ↑ |
| 8 | 0.92 | SMALL | X | SMALL | SMALL | SMALL | 40 | comparative example |
| 9 | 0.93 | MIDDLE | ○ | MIDDLE | MIDDLE | MIDDLE | 45 | present invention |
| 10 | 0.94 | MIDDLE | ○ | MIDDLE | MIDDLE | MIDDLE | 45 | ↑ |
| 11 | 0.94 | MIDDLE | Δ | MIDDLE | MIDDLE | MIDDLE | 55 | ↑ |
| 12 | 0.94 | MIDDLE | Δ | MIDDLE | MIDDLE | MIDDLE | 65 | ↑ |
| 13 | 0.85 | MIDDLE | Δ | MIDDLE | MIDDLE | MIDDLE | 70 | ↑ |
| 14 | 0.88 | MIDDLE | Δ | MIDDLE | MIDDLE | MIDDLE | 70 | ↑ |
| 15 | 0.80 | MIDDLE | Δ | MIDDLE | MIDDLE | MIDDLE | 70 | ↑ |

TABLE 2-continued

| No. | Neutron multiplying effect | Anti-swelling property | Ductility* | Reactivity with the structural members | Reactivity with the vapor | Tritium inventory | Thermal conductivity (W/m K) | remarks |
|---|---|---|---|---|---|---|---|---|
| 16 | 0.75 | MIDDLE | Δ | MIDDLE | MIDDLE | MIDDLE | 50 | ↑ |
| 17 | 0.70 | MIDDLE | Δ | MIDDLE | MIDDLE | MIDDLE | 65 | ↑ |
| 18 | 0.80 | MIDDLE | Δ | MIDDLE | MIDDLE | MIDDLE | 65 | ↑ |
| 19 | 0.82 | MIDDLE | Δ | MIDDLE | MIDDLE | MIDDLE | 65 | ↑ |
| 20 | 0.78 | MIDDLE | Δ | MIDDLE | MIDDLE | MIDDLE | 65 | ↑ |
| 21 | 0.85 | SMALL | ○ | SMALL | SMALL | SMALL | 50 | ↑ |
| 22 | 0.80 | MIDDLE | Δ | MIDDLE | MIDDLE | MIDDLE | 70 | ↑ |
| 23 | 0.75 | SMALL | ○ | SMALL | SMALL | SMALL | 50 | ↑ |
| 24 | 0.70 | MIDDLE | Δ | MIDDLE | MIDDLE | MIDDLE | 70 | ↑ |
| 25 | 0.75 | MIDDLE | Δ | MIDDLE | MIDDLE | MIDDLE | 70 | ↑ |
| 26 | 0.90 | MIDDLE | Δ | MIDDLE | MIDDLE | MIDDLE | 70 | ↑ |
| 27 | 0.78 | SMALL | Δ | SMALL | SMALL | SMALL | 70 | ↑ |
| 28 | 0.88 | SMALL | Δ | SMALL | SMALL | SMALL | 70 | ↑ |
| 29 | 0.65 | SMALL | ○ | MIDDLE | SMALL | SMALL | 100 | ↑ |
| 30 | 0.88 | SMALL | Δ | SMALL | SMALL | SMALL | 70 | ↑ |
| 31 | 0.78 | SMALL | Δ | SMALL | SMALL | SMALL | 70 | ↑ |
| 32 | 0.50 | SMALL | ○ | MIDDLE | SMALL | SMALL | 90 | ↑ |
| 33 | 0.80 | SMALL | Δ | SMALL | SMALL | SMALL | 70 | ↑ |
| 34 | 0.80 | SMALL | Δ | SMALL | SMALL | SMALL | 70 | ↑ |
| 35 | 0.80 | SMALL | Δ | SMALL | SMALL | SMALL | 70 | ↑ |
| 36 | 0.80 | SMALL | Δ | SMALL | SMALL | SMALL | 70 | ↑ |
| 37 | 0.80 | SMALL | Δ | SMALL | SMALL | SMALL | 70 | ↑ |
| 38 | 1.00 | LARGE | ◎ | LARGE | LARGE | LARGE | 170 | conventional |

As shown in Table 2, any of the examples of the present invention is excellent in the ductility and the anti-swelling property and has a proper neutron multiplying effect, a small tritium inventory and small reactivity with the structural members and the vapor.

In contrast to this, the comparative examples of No. 1 and No. 8 are poor in the ductility because they consist of 100 vol % of beryllium intermetallic compound.

The comparative example of No. 38 is excellent in the neutron multiplying effect and the ductility, because it consists of 100 vol % of metallic beryllium, but is large in the swelling and the tritium inventory and further large in the reactivity with the structural members and the vapor.

Second Embodiment

Cases where the metallic phase is a matrix of the material has been described in the aforementioned first embodiment. The present invention can be embodied with any combinations of distinct beryllium intermetallic compounds.

Specifically, substances obtained from mixing and casting a combination of beryllium and titanium so that $Be_{12}Ti$ and $Be_{17}Ti_2$ coexist and are intermixed therein are ascertained to be remarkably improved in ductility as compared with simple substances of $Be_{12}Ti$ and $Be_{17}Ti_2$.

A mixing ratio of $Be_{12}Ti$ and $Be_{17}Ti_2$ is not particularly limited, however, it is ascertained that the particularly preferable mixing ratios in a range of 10.5 to 2.0, or x in a range of 8.8 to 9.9 at % as described in a ratio x of Ti to Be, give especially excellent results.

Next, the present inventors conceived that any elements besides Ti might give similar effects and investigated various elements. As a result, it is ascertained that V, Mo, W, Zr, Nb and Ta give similar effects with Ti.

Furthermore, it is ascertained that the mixing ratios of the elements such that beryllium intermetallic compounds of $Be_{12}M$ and $Be_{17}M_2$ (where M is any one element selected from the group of V, Mo, W, Nb and Ta) (however, beryllium intermetallic compounds of $Be_{13}Zr$ and $Be_{17}Zr_2$ provided that M is Zr) coexist and are intermixed give excellent results as similar with Ti.

Moreover, concerning with metallographic structures of the composite phases of the beryllium intermetallic compounds, it is ascertained to be further advantageous in view of strength and ductility to set grain sizes of cast structures no more than 50 μm and particularly preferably no more than 20 μm.

Size of pebbles of the neutron multiplier material according to the present invention is preferably set about 0.1 through 3.0 mm in average particle diameter. Moreover, out-of-sphericity thereof is preferably set no more than 0.5 times the particle diameter.

Furthermore, concentration of Fe included in the neutron multiplier material is preferably set no more than about 0.4 mass % and concentration of mixed oxides is preferably set no more than about 5.0 mass %.

Next, production methods of the neutron multiplier material according to the present invention will be described hereinafter.

The present invention does not require particular limits to the production method, however, a rotating electrode method and a powder metallurgy method, both of which are previously publicly known, are preferably applied.

Rotating Electrode Method

To employ the rotating electrode method to produce neutron multiplier material pebbles, first of all, preparing consumable electrode is necessary. To prepare the consumable electrode, providing metals, weights of which correspond to a ratio satisfying a weight ratio of the respective constituents of the desired intermetallic compound, melting the metals together, casting the mixture and machining the cast into a predetermined electrode shape are accomplished.

Next, preparing the neutron multiplier material pebbles from the obtained consumable electrode by means of the rotating electrode method is accomplished.

Production conditions on this occasion are not particularly restricted, however, preferable conditions are described as follows.

atmospheric gas pressure: 500 to 12000 Torr
arc current: 100 to 1000 A
rotation speed of the consumable electrode: 4 to 1000 m/s Powder Metallurgy Method To produce neutron multiplier material pebbles by means of this method, mixing intermetallic compound powder prepared to be a desired compositional ratio and metal powder having a weight so as to be a predetermined ratio of metal phase included in the neutron multiplier material, filling the mixed powder in spherical metal molds or such, forming green compacts in spherical shapes by means of cold pressing or such and sintered to be pebbles in a vacuum atmosphere are accomplished.

EXAMPLE 2

Neutron multiplier materials respectively including beryllium intermetallic compounds and metals, compositions of which are described in Table 3, are produced by means of the rotating electrode method or the powder metallurgy method. Particle sizes of the obtained neutron multiplier materials are 0.7 to 1.3 mm.

Results of evaluation about a neutron multiplying effect, an anti-swelling property, a ductility, a reactivity with the structural member, a reactivity with the vapor, a tritium inventory and a heat conductivity of each of thus obtained neutron multiplier materials are described in Table 4.

Ductility

A compression test is accomplished with a test piece of approximate 1 mm (pebble in diameter in a condition of compression speed: 0.2 mm/min and ductility is evaluated on a shape after the test.

Reactivity with the Structural Members

A reactivity test with stainless steel in a He atmosphere of 6N for 800 to 1000 h is accomplished and the reactivity is evaluated on a degree of reaction with the structural members as three levels of SMALL (reaction layer: no more than 50 μm), MIDDLE (reaction layer: more than 50 μm and no more than 200 μm) and LARGE (reaction layer: more than 200 μm).

Reactivity with the Vapor

A reactivity test with the water vapor at 800 degree C. is accomplished and the reactivity is evaluated on a degree of reaction with the water vapor as three levels of SMALL (rarely oxidized), MIDDLE (oxidized) and LARGE (destructed by oxidation).

Tritium Inventory

Tritium inventory is evaluated on an amount of tritium of the test piece accomplished of the swelling test, measured by the temperature-programmed desorption method. Specifically, the tritium inventory is evaluated on degrees of the tritium inventory as three degrees of SMALL (extremely small amount), MIDDLE (some amount) and LARGE (large amount).

TABLE 3

| No | Combination of intermetallic compounds | Composition ratio* (at %) | Production method | Crystal grain size (μm) |
|---|---|---|---|---|
| 1 | $Be_{12}Ti$ and $Be_{17}Ti_2$ | 8 | rotational electrode | 30 |
| 2 | ↑ | 8 | HIP | 20 |
| 3 | ↑ | 9 | rotational electrode | 10 |
| 4 | ↑ | 9 | HIP | 20 |
| 5 | ↑ | 10 | rotational electrode | 20 |
| 6 | ↑ | 10 | HIP | 30 |
| 7 | $Be_{12}V$ and $Be_{17}V_2$ | 8 | rotational electrode | 35 |
| 8 | ↑ | 9 | rotational electrode | 25 |
| 9 | ↑ | 9 | HIP | 35 |
| 10 | ↑ | 10 | rotational electrode | 25 |
| 11 | $Be_{12}Mo$ and $Be_{17}Mo_2$ | 8 | rotational electrode | 30 |
| 12 | ↑ | 9 | rotational electrode | 20 |
| 13 | ↑ | 9 | HIP | 25 |
| 14 | ↑ | 10 | rotational electrode | 25 |
| 15 | $Be_{12}W$ and $Be_{17}W_2$ | 8 | rotational electrode | 35 |
| 16 | ↑ | 9 | rotational electrode | 25 |
| 17 | ↑ | 9 | HIP | 35 |
| 18 | ↑ | 10 | rotational electrode | 25 |
| 19 | $Be_{13}Zr$ and $Be_{17}Zr_2$ | 8 | rotational electrode | 35 |
| 20 | ↑ | 9 | rotational electrode | 20 |
| 21 | ↑ | 9 | HIP | 25 |
| 22 | ↑ | 10 | rotational electrode | 40 |
| 23 | $Be_{12}Nb$ and $Be_{17}Nb_2$ | 8 | rotational electrode | 30 |
| 24 | ↑ | 9 | rotational electrode | 20 |
| 25 | ↑ | 9 | HIP | 25 |
| 26 | ↑ | 10 | rotational electrode | 25 |
| 27 | $Be_{12}Ta$ and $Be_{17}Ta_2$ | 8 | rotational electrode | 35 |
| 28 | ↑ | 9 | rotational electrode | 25 |
| 29 | ↑ | 9 | HIP | 25 |
| 30 | ↑ | 10 | rotational electrode | 35 |
| 31 | Simple substance of $Be_{12}Ti$ | 7.7 | rotational electrode | 35 |
| 32 | $Be_{12}Ti$ and Be | 5 | rotational electrode | 50 |
| 33 | Simple substance of Be | — | rotational electrode | 100 |

*x is a ratio of M to Be

TABLE 4

| No. | Neutron multiplying effect | Anti-swelling property | Ductility* | Reactivity with the structural members | Reactivity with the vapor | Tritium inventory | Thermal conductivity (W/m K) | remarks |
|---|---|---|---|---|---|---|---|---|
| 1 | 0.89 | SMALL | ○ | SMALL | SMALL | SMALL | 40 | present invention |
| 2 | 0.89 | ↑ | ○ | ↑ | ↑ | ↑ | 40 | ↑ |
| 3 | 0.87 | ↑ | ◉ | ↑ | ↑ | ↑ | 40 | ↑ |

TABLE 4-continued

| No. | Neutron multiplying effect | Anti-swelling property | Ductility* | Reactivity with the structural members | Reactivity with the vapor | Tritium inventory | Thermal conductivity (W/m K) | remarks |
|---|---|---|---|---|---|---|---|---|
| 4 | 0.87 | ↑ | ○ | ↑ | ↑ | ↑ | 40 | ↑ |
| 5 | 0.85 | ↑ | ○ | ↑ | ↑ | ↑ | 40 | ↑ |
| 6 | 0.85 | ↑ | ○ | ↑ | ↑ | ↑ | 40 | ↑ |
| 7 | 0.89 | ↑ | ○ | ↑ | ↑ | ↑ | 40 | ↑ |
| 8 | 0.87 | ↑ | ◉ | ↑ | ↑ | ↑ | 40 | ↑ |
| 9 | 0.87 | ↑ | ○ | ↑ | ↑ | ↑ | 40 | ↑ |
| 10 | 0.85 | ↑ | ○ | ↑ | ↑ | ↑ | 40 | ↑ |
| 11 | 0.89 | ↑ | ○ | ↑ | ↑ | ↑ | 50 | ↑ |
| 12 | 0.87 | ↑ | ◉ | ↑ | ↑ | ↑ | 50 | ↑ |
| 13 | 0.87 | ↑ | ○ | ↑ | ↑ | ↑ | 50 | ↑ |
| 14 | 0.85 | ↑ | ○ | ↑ | ↑ | ↑ | 50 | ↑ |
| 15 | 0.89 | ↑ | ○ | ↑ | ↑ | ↑ | 70 | ↑ |
| 16 | 0.87 | ↑ | ◉ | ↑ | ↑ | ↑ | 70 | ↑ |
| 17 | 0.87 | ↑ | ○ | ↑ | ↑ | ↑ | 70 | ↑ |
| 18 | 0.85 | ↑ | ○ | ↑ | ↑ | ↑ | 70 | ↑ |
| 19 | 0.89 | ↑ | ○ | ↑ | ↑ | ↑ | 70 | ↑ |
| 20 | 0.87 | ↑ | ◉ | ↑ | ↑ | ↑ | 70 | ↑ |
| 21 | 0.87 | ↑ | ○ | ↑ | ↑ | ↑ | 70 | ↑ |
| 22 | 0.85 | ↑ | ○ | ↑ | ↑ | ↑ | 70 | ↑ |
| 23 | 0.89 | ↑ | ○ | ↑ | ↑ | ↑ | 50 | ↑ |
| 24 | 0.87 | ↑ | ◉ | ↑ | ↑ | ↑ | 50 | ↑ |
| 25 | 0.87 | ↑ | ○ | ↑ | ↑ | ↑ | 50 | ↑ |
| 26 | 0.85 | ↑ | ○ | ↑ | ↑ | ↑ | 50 | ↑ |
| 27 | 0.89 | ↑ | ○ | ↑ | ↑ | ↑ | 60 | ↑ |
| 28 | 0.87 | ↑ | ◉ | ↑ | ↑ | ↑ | 60 | ↑ |
| 29 | 0.87 | ↑ | ○ | ↑ | ↑ | ↑ | 60 | ↑ |
| 30 | 0.85 | ↑ | ○ | ↑ | ↑ | ↑ | 60 | ↑ |
| 31 | 0.90 | SMALL | X | SMALL | SMALL | SMALL | 40 | comparative example |
| 32 | 0.92 | ↑ | ○ | MIDDLE | MIDDLE | MIDDLE | 55 | ↑ |
| 33 | 1.00 | LARGE | ◉ | LARGE | LARGE | LARGE | 170 | conventional |

*1) shapes after compression tests
◉: deformed (without features)
○: deformed (with micro-fractures)
Δ: deformed (with small fractures)
X: broken As shown in Table 4, any of the examples of the present invention is excellent in the ductility and the anti-swelling property and has a high neutron multiplying effect, a small tritium inventory and small reactivity with the structural members and the vapor.

In contrast to this, the comparative example of No. 31 is poor in the ductility because this example consists of a simple substance of $Be_{12}Ti$.

The comparative example of No. 32 includes a metal phase as binder between beryllium intermetallic compound phases so that the ductility and the anti-swelling property are excellent, the tritium inventory is small and reactivity with the structural members and the vapor is small, however, the high neutron multiplying effect thereof is not satisfactory.

The comparative example of No. 33 is excellent in the neutron multiplying effect and the ductility, because it consists of 100 vol % of metallic beryllium, but is large in the swelling and the tritium inventory and further large in the reactivity with the structural members and the vapor.

Third Embodiment

In a case where the present invention is embodied with a combination of the distinct beryllium intermetallic compounds, any of the materials according to the present invention has a particularly excellent property as a material facing to plasma.

Specifically, substances obtained from mixing and casting a combination of beryllium and titanium so that $Be_{12}M$ and $Be_{17}M_2$ coexist and are intermixed therein are ascertained to be remarkably improved in ductility as compared with simple substances of $Be_{12}M$ and $Be_{17}M_2$.

A mixing ratio of $Be_{12}M$ and $Be_{17}M_2$ is not particularly limited, however, it is ascertained that the particularly preferable mixing ratios in a range of 10.5 to 2.0, or x in a range of 8.8 to 9.9 at % as described in a ratio x of M to Be, give especially excellent results.

Moreover, concerning with metallographic structures of the composite phases of the beryllium intermetallic compounds, it is ascertained to be further advantageous in view of strength to set grain sizes of cast structures no more than 30 μm and particularly preferably no more than 20 μm.

Next, production methods of the plasma facing material according to the present invention will be described hereinafter.

Beryllium powder or beryllium intermetallic compound powder is prepared so as to be a desired composition and the prepared powder is filled in a mold. Stainless steel is ordinarily applied to such a mold and accomplished with canning by means of electron-beam welding.

HIP is accomplished at 1200 to 1500 degree C. and 100 to 200 MPa for approximate 1 to 5 hours by means of a HIP (hot isostatic pressing) machine.

Next, the material is took out of the mold and finished with machining.

EXAMPLE 3

The plasma facing materials respectively having compositions as shown in Table 5 are produced by means of the HIP method.

In this occasion, a particle size of the provided powder is 0.6 μm and the HIP condition is that the temperature is 1300 degree C. and the pressure is 150 MPa. Crystal particle sizes of the obtained plasma facing materials are in a range of 5 to 20 μm.

Results of evaluation about a radiation loss, a sputtering property and a tritium absorbency of each of thus obtained plasma facing materials are described in Table 6.

In addition, the respective properties are evaluated by the following procedures.

Radiation Loss

Smaller atomic weight gets the radiation loss more preferable, hence average atomic weight of the compounds is employed for evaluation.

Sputtering Property

A melting point is employed for evaluation of a physical sputtering property. Furthermore, a chemical sputtering property is on degrees of reactivity with hydrogen (at 600 degree C.) as three levels of ○ (hardly react), Δ (slightly react) and X (considerably react).

Tritium Absorbency

An amount of tritium absorbed in the material after being kept in a tritium atmosphere for 3 hours is measured by the temperature-programmed desorption method and the tritium absorbency is evaluated on the measured value as three levels of LARGE, MIDDLE and SMALL.

TABLE 5

| No | Element of M | Composition ratio* (at %) | Combination of intermetallic compounds | Crystal grain size (μm) |
|---|---|---|---|---|
| 1 | Ti | 6.5 | Be and $Be_{12}Ti$ | 15 |
| 2 | ↑ | 9.0 | $Be_{12}Ti$ and $Be_{17}Ti_2$ | 10 |
| 3 | ↑ | 10.0 | ↑ | 8 |
| 4 | ↑ | 12.0 | $Be_{17}Ti_2$ and $Be_3Ti$ | 12 |
| 5 | V | 6.0 | Be and $Be_{12}V$ | 17 |
| 6 | ↑ | 9.0 | $Be_{12}V$ and $Be_{17}V_2$ | 13 |
| 7 | ↑ | 10.0 | ↑ | 11 |
| 8 | ↑ | 12.0 | $Be_{17}V_2$ and $Be_3V$ | 10 |
| 9 | Mo | 5.5 | Be and $Be_{12}Mo$ | 14 |
| 10 | ↑ | 9.0 | $Be_{12}Mo$ and $Be_{17}Mo_2$ | 12 |
| 11 | ↑ | 10.0 | ↑ | 10 |
| 12 | ↑ | 12.0 | $Be_{17}Mo_2$ and $Be_3Mo$ | 11 |
| 13 | W | 6.5 | Be and $Be_{12}W$ | 20 |
| 14 | ↑ | 9.0 | $Be_{12}W$ and $Be_{17}W_2$ | 18 |
| 15 | ↑ | 10.0 | ↑ | 16 |
| 16 | ↑ | 12.0 | $Be_{17}W_2$ and $Be_3W$ | 5 |
| 17 | Zr | 7.0 | Be and $Be_{13}Zr$ | 18 |
| 18 | | 9.0 | $Be_{13}Zr$ and $Be_{17}Zr_2$ | 17 |
| 19 | | 10.0 | ↑ | 15 |
| 20 | | 12.0 | $Be_{17}Zr_2$ and $Be_3Zr$ | 13 |
| 21 | Nb | 6.5 | Be and $Be_{12}Nb$ | 13 |
| 22 | | 9.0 | $Be_{12}Nb$ and $Be_{17}Nb_2$ | 12 |
| 23 | | 10.0 | ↑ | 9 |
| 24 | | 12.0 | $Be_{17}Nb_2$ and $Be_3Nb$ | 10 |
| 25 | Ta | 6.0 | Be and $Be_{12}Ta$ | 12 |
| 26 | | 9.0 | $Be_{12}Ta$ and $Be_{17}Ta_2$ | 11 |
| 27 | | 10.0 | ↑ | 9 |
| 28 | | 12.0 | $Be_{17}Ta_2$ and $Be_3Ta$ | 10 |
| 29 | Ti | 7.7 | Simple substance of $Be_{12}Ti$ | 15 |
| 30 | none | 0 | Simple substance of Be | 5 |

*x is a ratio of M to Be

TABLE 6

| No | Radiation loss | Sputtering property physical | Sputtering property chemical | Tritium absorbent | remarks |
|---|---|---|---|---|---|
| 1 | 2.2 | 1500 | ○ | SMALL | Present invention |
| 2 | 2.5 | 1520 | ↑ | ↑ | ↑ |
| 3 | 2.6 | 1550 | ↑ | ↑ | ↑ |
| 4 | 2.8 | 1500 | ↑ | ↑ | ↑ |
| 5 | 3.6 | 1670 | ↑ | ↑ | ↑ |
| 6 | 3.9 | 1700 | ↑ | ↑ | ↑ |
| 7 | 4.1 | 1750 | ↑ | ↑ | ↑ |
| 8 | 4.3 | 1650 | ↑ | ↑ | ↑ |
| 9 | 2.9 | 1630 | ↑ | ↑ | ↑ |
| 10 | 3.1 | 1650 | ↑ | ↑ | ↑ |
| 11 | 3.2 | 1680 | ↑ | ↑ | ↑ |
| 12 | 3.4 | 1600 | ↑ | ↑ | ↑ |
| 13 | 4.2 | 1680 | ↑ | ↑ | ↑ |
| 14 | 4.4 | 1700 | ↑ | ↑ | ↑ |
| 15 | 4.5 | 1720 | ↑ | ↑ | ↑ |
| 16 | 4.7 | 1650 | ↑ | ↑ | ↑ |
| 17 | 2.7 | 1680 | ↑ | ↑ | ↑ |
| 18 | 2.8 | 1700 | ↑ | ↑ | ↑ |
| 19 | 2.9 | 1710 | ↑ | ↑ | ↑ |
| 20 | 3.1 | 1650 | ↑ | ↑ | ↑ |
| 21 | 2.9 | 1580 | ↑ | ↑ | ↑ |
| 22 | 3.0 | 1600 | ↑ | ↑ | ↑ |
| 23 | 3.1 | 1630 | ↑ | ↑ | ↑ |
| 24 | 3.3 | 1520 | ↑ | ↑ | ↑ |
| 25 | 4.0 | 1750 | ↑ | ↑ | ↑ |
| 26 | 4.2 | 1760 | ↑ | ↑ | ↑ |
| 27 | 4.3 | 1780 | ↑ | ↑ | ↑ |
| 28 | 4.4 | 1700 | ↑ | ↑ | ↑ |
| 29 | 2.3 | 1550 | ○ | SMALL | Comparative example |
| 30 | 1.9 | 1280 | X | LARGE | ↑ |

As shown in Table 6, any of the examples of the present invention has a small radiation loss, a small sputtering erosion and a small tritium absorbent.

In contrast to this, the comparative example of No. 29 is defective of brittleness at a room temperature though satisfactory in the other properties because this example consists of a simple substance of $Be_{12}Ti$.

Moreover, the comparative example of No. 30 is excellent in the radiation loss, because it consists of 100% of metallic beryllium, but is poor in the sputtering property and the tritium absorbent.

Although the invention has been described above by reference to certain embodiments of the invention, the invention is not limited to the embodiments described above. Modifications and variations of the embodiments described above will occur to those skilled in the art, in light of the above teachings.

Moreover, throughout the present description and claims, the phrase "consisting essentially of —" is defined and used as a meaning of including — as essential ingredients but excluding additional unspecified ingredients that would affect the basic and novel characteristics of the product. However, the phrase does not exclude a possibility that the product includes any other ingredients that would not affect the basic and novel characteristic of the product.

INDUSTRIAL APPLICABILITY

The present invention provides neutron multiplier materials for nuclear fusion reactors, which are excellent in high-temperature properties and machinability so as to be high productivity, and further easy to handle. The present invention further provides plasma facing materials for nuclear fusion reactors, which lead to small sputtering erosion and small radiation loss in a case of being contaminated in the plasma and absorb a small amount of tritium.

The invention claimed is:

1. A material for a nuclear fusion reactor, the material consisting essentially of:
   an alloy including two or more substances selected from the group consisting of $Be_{12}M$ or $Be_{13}M$, $Be_{17}M_2$ and Be;
   wherein M is a metal element selected from the group consisting of Ti, V, Mo, W, Zr, Nb and Ta; and
   wherein a composition ratio x of M to Be is in a range of $2.0 \leqq x \leqq 15.0$ (at %).

2. The material for a nuclear fusion reactor according to claim 1,
   wherein a composition ratio x of M to Be is in a range of $7.7 < x < 10.5$ (at %).

3. The material for the nuclear fusion reactor of claim 1,
   wherein the alloy is produced by casting; and
   wherein a crystal grain size of the alloy is no more than 50 μm.

4. The material for the nuclear fusion reactor of claim 1,
   wherein the alloy is produced by powder metallurgy; and
   wherein a crystal grain size of the alloy is no more than 50 μm.

5. A plasma facing material for a nuclear fusion reactor comprising the material for the nuclear fusion reactor of claim 1.

* * * * *